Figure 1:
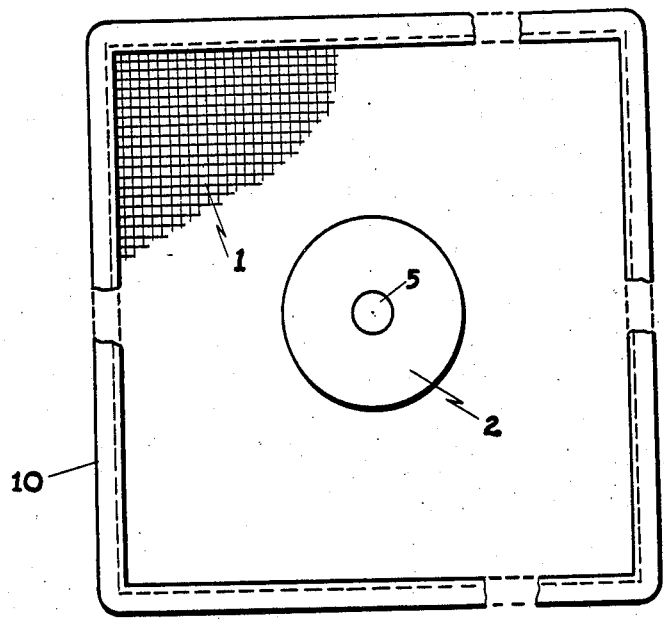

Jan. 22, 1935.  H. E. SCHELLENBERGER  1,988,573
INSECT DESTROYING IMPLEMENT
Filed March 24, 1934

INVENTOR.
Horst E. Schellenberger
BY
William F. Nickel
ATTORNEY.

Patented Jan. 22, 1935

1,988,573

UNITED STATES PATENT OFFICE 1,988,573

INSECT DESTROYING IMPLEMENT

Horst E. Schellenberger, Whiteport-Kingston, N. Y.

Application March 24, 1934, Serial No. 717,242

2 Claims. (Cl. 43—133)

My invention relates to an improved device for killing insects; and especially to a handy implement for destroying mosquitoes, flies spiders, ants and the like which invade the dwellings of human beings.

An object of the invention is to provide a simple and inexpensive appliance by which an insect can easily be taken unawares and effectually dispatched without requiring any speedy muscular effort on the part of the user. The implement is thus subjected to very little actual stress, and is capable of long service because it is unlikely to be broken or damaged in practice.

The objects and advantages of the invention will fully appear in the ensuing specification and the novel features pointed out in the appended claims; but details of construction are of course unimportant and I may make changes without departing from the spirit of the invention.

Figure 2:
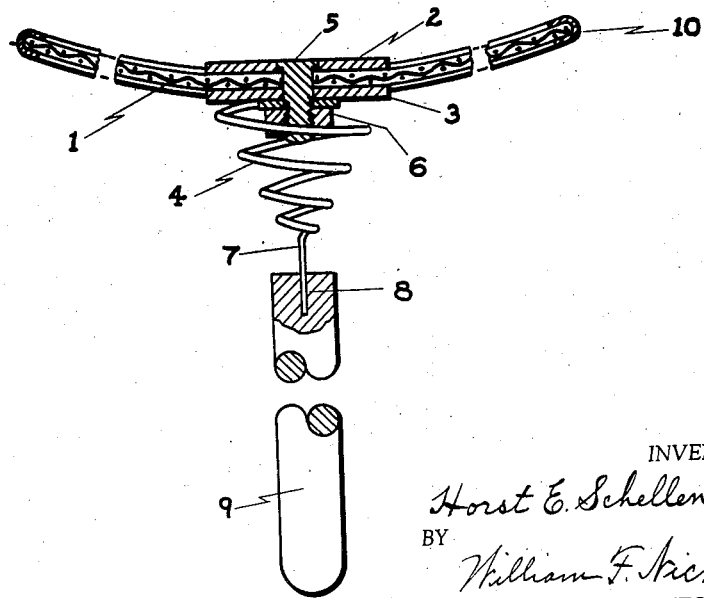

On the drawing:

Fig. 1 shows a top plan of a principal part of my improved insect killing device; and Fig. 2 is a longitudinal section view thereof.

The same numerals identify the same parts throughout.

The implement comprises a piece of wire gauze indicated at 1 that is approximately square and will measure about eight inches along one side. However, the shape and dimensions may of course be varied. This sheet of gauze is curved from one end to the other to a slight extent so that it is concave on its upper face and convex on the lower. At the middle it is engaged by an upper disc 2 and a lower disc 3; the latter being affixed to a spring 4 by means of a screw 5 and nut 6; the screw passing through the two discs and the sheet of gauze 1 so that the gauze is clamped tightly between these discs. The head of the screw 5 is preferably flush with the top face of the upper disc and the nut 6 on the lower end of the screw binds the looped end of the spring 4 in place. This spring is preferably conical or tapering so that the successive coils become smaller and smaller and the extremity remote from the screw 5 is bent so as to be in line with the axis of the spring and screw 5 and can be inserted into a hole 8 on the end of a rod or stick 9. This stick may be of suitable length and made in one piece or in sections to be detachably jointed together if desired. The piece of gauze 1 is surrounded by a suitable border 10, which may be tape or braid stitched along all of the edges of the gauze.

To use the device one takes hold of the handle or rod 9 and pushes the piece of gauze towards an insect so as to catch the latter between the concave piece of gauze 1 and the surface on which the insect has alighted. When the gauze has been carried to within a few inches of the insect it is pushed smartly against the surface so as to catch the insect between the gauze and the surface and crush it. It can be effectively used no matter whether the insect is on a vertical wall or a horizontal ceiling; and it can be just as effectively utilized by inverting it to kill a fly or other insect on a desk, table or floor. No swift sudden movement is necessary because the gauze 1 can be moved stealthily towards the victim and then only a short final thrust is necessary to clamp the gauze over it and crush it. The implement not only destroys the pest but will not inflict any unsightly stain on table cloth or wall paper. When the gauze encounters the wall or similar surface it of course is pressed out flat and the insect is caught and its body, wings and limbs are broken between the rigid surface on one hand and the wires of the gauze on the other.

The article can be very cheaply produced and sold as a novelty by attaching it to a cardboard panel in knocked down form, especially if the rod is made in separable sections. On account of the fact that it meets with no rough handling when employed for its intended purpose and does not have to be swung smartly and brought to a stop very abruptly against a rigid surface, like a fly-swatter, it does not get broken or impaired, but will last the owner for a very long period.

Of course I can make the sheet of gauze 1 round or give it some other form if desired.

Having described the invention, what is claimed is:

1. An insect destroying device comprising a curved sheet of gauze with a border extending around the circumference thereof, said sheet being concave on one face and convex on the other, a pair of discs on the opposite faces of said gauze, a conical spring, a screw and a nut passing through the discs and engaging one end of the spring to hold the discs, the gauze and the spring securely together, said spring being on the convex side of said gauze and having one extremity bent into line with said screw, and a rod having a hole in one extremity to receive the end of the spring and enable the gauze to be carried on the end of the rod.

2. An insect-destroying implement comprising a curved sheet of gauze, a coiled spring, the sheet of gauze extending across one end of the spring and being secured thereto, with its concave side turned away from the spring, and a rod to be engaged by the other end of the spring, to enable the gauze and spring to be carried by said rod.

HORST E. SCHELLENBERGER.